(No Model.)

L. L. DICK.
TEA OR COFFEE POT.

No. 597,574. Patented Jan. 18, 1898.

WITNESSES:
Joshua Bergelman
H. L. Reynolds

INVENTOR
L. L. Dick
BY
ATTORNEYS.

UNITED STATES PATENT OFFICE.

LEONARD L. DICK, OF BOSTON, MASSACHUSETTS.

TEA OR COFFEE POT.

SPECIFICATION forming part of Letters Patent No. 597,574, dated January 18, 1898.

Application filed April 9, 1897. Serial No. 631,368. (No model.)

*To all whom it may concern:*

Be it known that I, LEONARD L. DICK, of South Boston, in the county of Suffolk and State of Massachusetts, have invented a new and Improved Tea or Coffee Pot, of which the following is a full, clear, and exact description.

My invention relates to improvements in such vessels as tea or coffee pots, and has for its object to make the covers and handles thereof adjustable and when in use locked thereon, so that they will be less liable to breakage than when such devices are secured to the vessels in the usual manner.

Reference is to be had to the accompanying drawings, forming a part of this specification, in which similar characters of reference indicate corresponding parts in all the figures.

Figure 1:
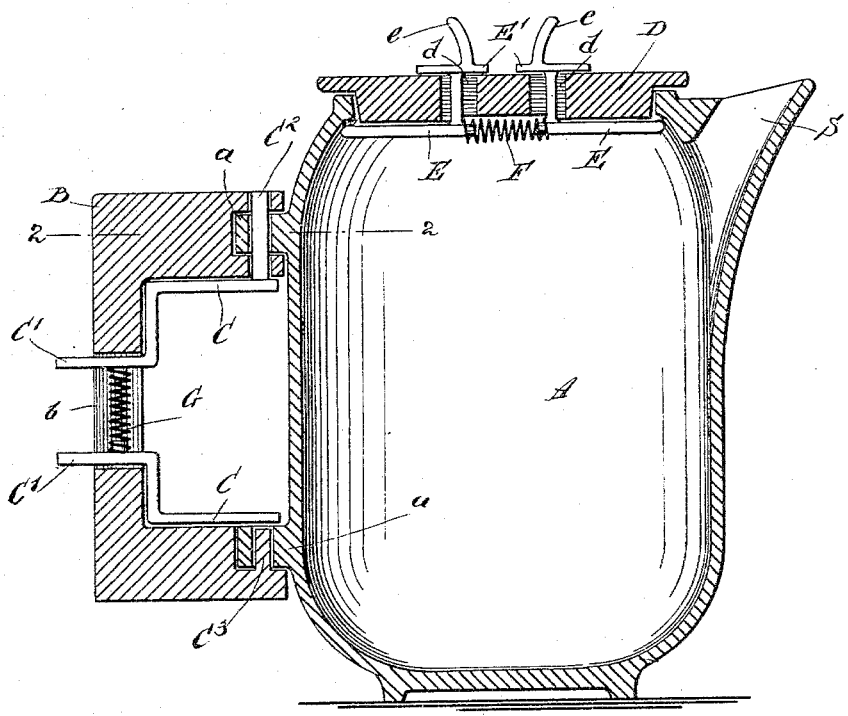
Figure 2:
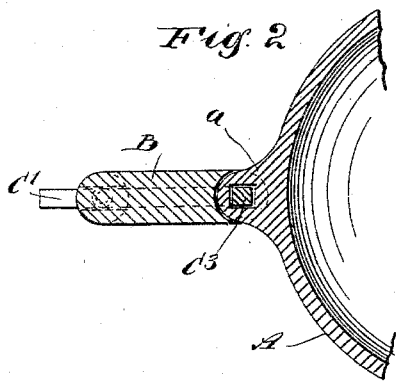
Figure 3:
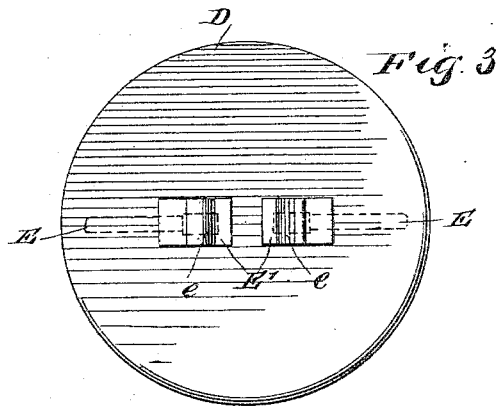

Figure 1 is a sectional elevation of my improvement as attached to a teapot. Fig. 2 is a horizontal section taken upon the line 2 2 of Fig. 1, and Fig. 3 is a plan view of the cover.

In such vessels as coffee and tea pots, especially those made from earthernware of usual design, it quite often happens that the projecting portions thereof—such as the handle, spout, and also the cover—become broken. When this happens, it frequently means the practical destruction of the entire vessel, as the parts cannot be mended or replaced.

In the vessel as constructed according to my invention the parts liable to be thus broken are made detachable, so that when such a part is broken it may be replaced and the entire vessel is not a loss. The nose, instead of being made in the usual form projecting from near the bottom of the pot and very likely to be broken off, is made short and attached to the upper end of the vessel, as shown at S. In this form it is not likely to be injured.

Instead of having a handle made as a part of the vessel itself, the body of the vessel A is provided with two lugs $a$, projecting from the side opposite the spout. These lugs are provided with holes adapted to receive the fastening of the handle. These holes are preferably made of a polygonal section, as shown clearly in Fig. 2, where the same is shown as square.

The handle B is made detachable and has the horizontal portions thereof so proportioned as to engage the lugs $a$. The lower portion of the handle has a pin $C^3$ projecting into the hole in the lower lug $a$. The upper portion of the handle has a recess embracing the upper lug $a$ at both top and bottom. It is also provided with holes adapted to register with the hole in the lug. In its central portion the handle is shown as provided with a slot $b$. Projecting through this slot are the outer ends $C'$ of the bars $C$. The upper one of these bars is provided with a pin $C^2$, adapted to pass through the holes in the upper lug $a$ and the upper part of the handle. The lower bar C is adapted to engage the upper surface of the lower lug $a$ and prevent disengagement of the handle therefrom. Between the outer ends $C'$ of these bars and lying within the slot $b$ is a spiral spring G, acting upon these bars to press them outward. When it is desired to disengage the handle from the teapot, the outer projecting ends $C'$ are pressed together by squeezing the same between the thumb and fingers. This compresses the spring G and draws the pin $C^2$ out of the lug $a$, thus releasing the handle.

The handle is intended to be attached to the pot only when the same is placed upon the table or otherwise in actual use. When the teapot is on the stove being heated, or at any other time when not in actual use, the handle is to be removed therefrom. This is the time when the handle is most likely to be broken. If removed during this period, the chances for its breakage are reduced, and it is readily replaced when it is desired to use the teapot.

If the handle should at any time become broken, it may be readily replaced by getting a new handle, the cost of which will be much less than the cost of an entirely new pot. The spout being made small, as shown, is not liable to be broken off.

The cover is also made removable and so that it will be automatically locked when put on the pot. This cover D has two slots $d$ in line with each other. Beneath the cover are the two bars E, which are adapted to have their outer ends projected beneath the flanged edge of the pot. Between these two bars is placed a spiral spring F, which acts upon the bars to force them upward, so as to engage the flange upon the pot. The bars have vertical extensions which pass through the slots $d$ in the cover, and to the upper ends of these extensions are attached the handles $e$ and a plate E', by means of which the position of the bars E is readily controlled.

The handles $e$ are the means by which the cover is lifted. In engaging these handles between the thumb and fingers the bars are drawn together, compressing the spring F, so that the outer end of these bars will be disengaged from the upper end of the pot, thus allowing the lid to be lifted.

In placing the cover upon the pot the bars E will be similarly pressed toward the center, so that their outer ends will not engage the pot. After the lid is in place and the handles $e$ are freed these bars will be thrown out, so as to automatically lock the cover on the pot. With covers simply resting upon the pot, as with the ordinary construction, they are liable to fall off when pouring the tea or coffee from the same. When this happens, it is liable to break the cup in which the tea is being poured as well as the cover of the pot itself. In my construction both of these accidents are prevented. The cover is automatically locked on the pot and cannot fall off, thereby preserving the cover and preventing damage to the cup into which the liquid is being poured. In case the cover is broken it may be replaced by another cover and the use of the pot need not be entirely lost.

Although I have herein described my invention as applied to coffee and tea pots only, it is evident that it may be applied to any vessels of the same character. I do not therefore wish to limit myself to its application upon tea and coffee pots only.

Having thus fully described my invention, I claim as new and desire to secure by Letters Patent—

1. A tea or coffee pot, having two vertically-disposed lugs, each having a vertical polygonal hole therethrough, and a handle having spring-catches adapted to engage the holes in said lugs, substantially as described.

2. A tea or coffee pot, having two vertically-disposed lugs with holes therethrough, a handle, the ends of which engage said lugs, bars sliding in guides on said handle and movable to lock the handle to the lugs, and a spring between said bars to force them out into locking position, substantially as described.

3. A tea or coffee pot, having two vertically-disposed lugs with holes therethrough, a handle, the ends of which engage said lugs, and bars sliding in guides on said handle and movable to lock the handle to the lugs, the outer ends of the bars projecting so that they may be engaged by the hand, substantially as described.

LEONARD L. DICK.

Witnesses:
FREDERICK S. MANN,
WM. R. HEMAN.